Oct. 14, 1924.
A. A. SMITH ET AL
1,511,917
TIRE CHAIN FASTENER AND LOCK
Filed Jan. 24, 1924
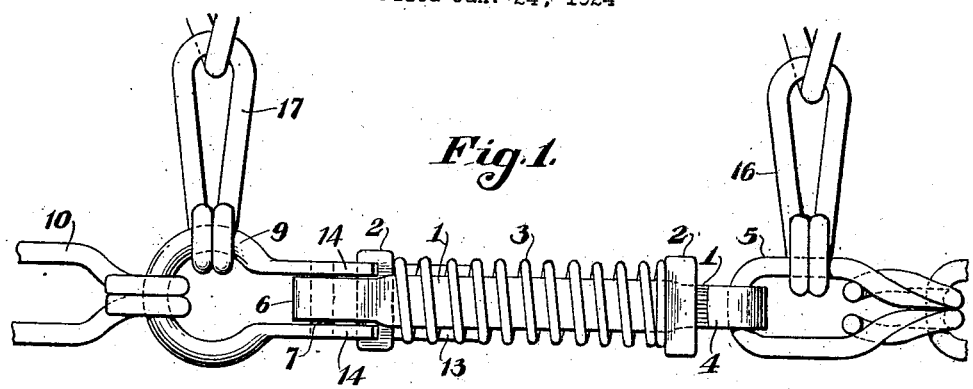
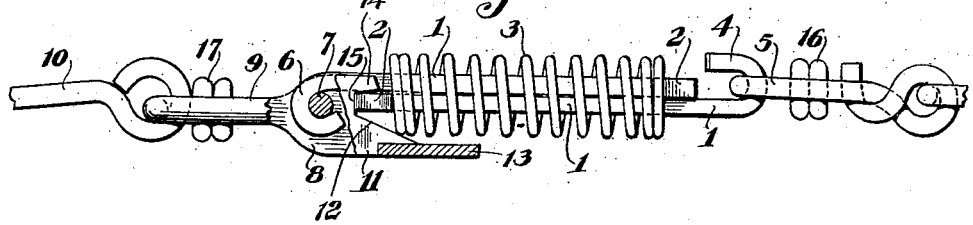
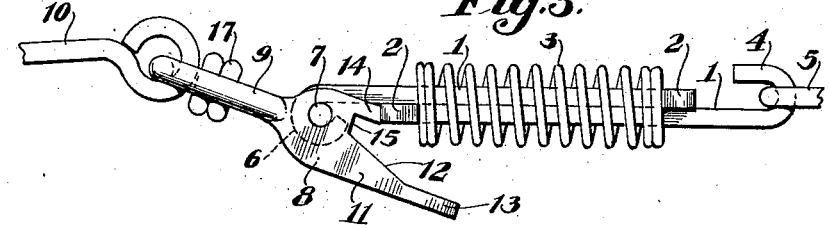
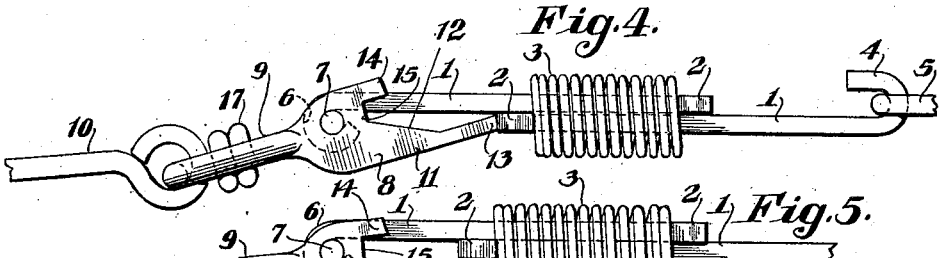
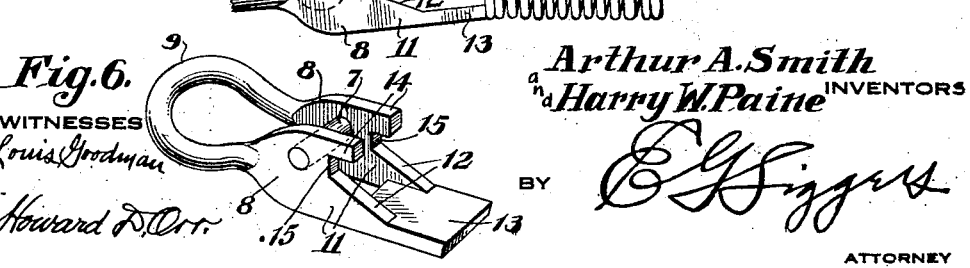

Patented Oct. 14, 1924.

1,511,917

UNITED STATES PATENT OFFICE.

ARTHUR A. SMITH AND HARRY W. PAINE, OF EAGLE GROVE, IOWA.

TIRE-CHAIN FASTENER AND LOCK.

Application filed January 24, 1924. Serial No. 688,279.

*To all whom it may concern:*

Be it known that we, ARTHUR A. SMITH and HARRY W. PAINE, citizens of the United States, residing at Eagle Grove, in the county of Wright and State of Iowa, have invented new and useful Improvements in Tire-Chain Fasteners and Locks, of which the following is a specification.

This invention relates to tire chain locks, and is designed particularly as an improvement on the locks disclosed in the Patents No. 1,374,771 and No. 1,462,666, issued to us on tire chain locks and elastic take-ups.

In the first Patent, No. 1,374,771, there is disclosed a device comprising oppositely movable bars or slides in face-to-face engagement, each bar terminating at one end in a loop and at the other end in a lug angularly related to the bar, and a spring surrounding the two bars and holding them in contact and at the ends engaging the respective lugs, the loop of one bar being sufficiently open to form a throat to receive a link of the tire chain and also a lug of the other bar, said lug entering and substantially closing the open throat of the loop.

In the second Patent, No. 1,462,666, provision is made through a pivotally mounted latch member, to hold the spring compressed so that the tire chain lock may be held in open position until the chain has been properly applied.

The object of the present invention is to provide means for holding the chain lock open in three different positions for the fastening and unfastening of the tire chain, when applying or detaching the tire chains from the wheels of the car.

Another object is to incorporate such holding means into the structure of the fastener and lock so that one end link of the side chain may be permanently connected to and always carry said fastener and lock therewith, while permitting the members comprising the latter to be elongated and to be held in such position for hooking in the other end link of said chain.

A further object is to provide locking means for elastic fasteners or connectors for the ends of tire chains which is always in readiness to be swung into position, after various degrees of compression have been placed on the spring of the connector, and to rigidly hold the same at such position while the attachment is made, and which may be readily unlocked by a mere blow to allow the parts to automatically move into operative position to take up the slack in the chains.

A final object is to provide means for connecting both the side chain and the cross chain directly to a portion of the chain lock.

A full and complete understanding of the invention may be obtained from a consideration of the following detailed description, taken in connection with the accompanying drawing forming a part of this specification, it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures:

Figure 1 is a side elevation of the improved fastener attached to the end links of a side chain and portions of two cross chains;

Figure 2 is a top plan view thereof, partly in section, the fastener being in a position to draw the ends of the chain together;

Figure 3 is a similar view showing the lock in position for permitting the loose end link to be detached;

Figures 4 and 5 are views similar to Figure 3, but showing the means of holding the connector or fastener in greater degrees of extension as when detaching a chain which is clogged with mud, etc.;

Figure 6 is a detail perspective view of the improved locking member for holding the fastener or connector in extended position.

In the use of ordinary spring-contracted fasteners or connectors of this class, wherein there is no locking means employed for holding the engaging members apart while attaching or detaching the end links of the chains, it is the common practice to insert a coin or some other small object at some convenient point for this purpose, which has always proven very unsatisfactory. The present invention has been designed to remedy this by the provision of means permanently secured to the device, and adapted to be easily and quickly swung into position to hold the connecting members in the desired degree of extension while performing such operations, and which, when desired, will automatically snap into proper position to hold the locking member from any swinging movement, which might injure the tire while the car is under way.

In the drawing there is illustrated a fastener such as disclosed in the above-mentioned patents, and which comprises a pair of elongated bars 1 arranged in face-to-face engagement and constituting oppositely sliding members which overlap each other for a major portion of their lengths.

Each slidable member 1 is provided at the end which rests against the other member with a laterally extending cross head or lug 2, the ends of which project somewhat beyond the side edges of said members and are adapted to receive between the same a coiled spring 3, which surrounds the said members and bears at its ends against said cross heads or lugs so as to constantly exert an outward pressure.

One of the members 1, where projecting beyond the cross head of the other member, is provided with a return bend loop or hook 4, which is adapted to receive the end link 5 of a side chain of an ordinary anti-skid device, and the entrance opening into said hook is normally partially closed by the cross head of the other member, so that said link may not accidentally become disengaged therefrom.

The projecting end of the other member 1 is provided with an eye or loop 6 formed by turning the bar around in a direction in line with the cross head of the other member 1, and the said eye has an entrance opening through which a pivot pin 7 may be forced to assume a position transversely of the device, and to remain therein except when forced out by pressure such as blows from a hammer, etc.

The pivot pin extends beyond the sides of the eye and the ends are riveted or otherwise secured in the side walls 8 of a clip or locking member, which constitutes the principal novelty of the present invention.

The side walls 8 of the clip are suitably apertured for the reception of the ends of the pivot, and the major portions of the walls is located at one side of the axis of the pivot, and are joined together at their outer ends by a loop 9 formed integrally therewith, and partially circular, the said loop being designed to receive the other end link 10 of the side chain of the anti-skid device.

The projecting portions of the side walls are extended toward the center of the sliding members 1 to form arms 11 having their inner edges inclined, as at 12, and joined at their ends by a cross plate 13 constituting a main finger for a purpose to be explained. The side plates are furthermore provided with inner short fingers 14, extended in the same direction as the main finger.

The inner fingers 14 are considerably shorter than the outer fingers 13, and there is thus provided between the inner edge of the same and the terminal of the inclined edge 12 of said arms 11, a recess or seat 15 in exact alinement with the pivot pin 7, and of a width to receive the projecting portions of the adjacent cross head 2, when the device is in operation to resiliently hold the ends of a side chain of an anti-skid device (Fig. 2).

The length and proportions of the improved connector or fastener are such as to permit of one of the cross chains 16 having one end link fastened to the end link 5 of the side chain, while another cross chain may have an end link 17 secured to the loop 9, which latter provision is of great value as the said connection serves to steady the connector.

When the device is installed on a wheel and the expansive force of the spring 3 is maintaining the side chains in a taut condition, the adjacent cross head 2 is seated in the recess or seat 15, and the clip or lock is prevented from rotating about the pivot by reason of the engagement of the fingers 14 and the inclined edge 12 with said cross head, at which time the plate comprising the finger 13 is located outside of the adjacent end of the spring 3 and overhangs the same.

When it is desired to remove the anti-skid device from the wheel of the automobile, it is only necessary to grasp the side chain at either side of the device and exert a pull to separate the members 1 and compress the spring 3. The locking cross head 2 is thus drawn from the seat 15, and the clip or lock may be rocked about the pivot 7 to the position shown in Figure 3, when the short fingers 14 may be engaged against the cross head 2 and a minimum amount of extension of the connector obtained, which may be all that is necessary to disengage the link 5 from the hook 4. If, however, the chains should be clogged with mud, etc., or the same be short, a greater amount of extension of the connector may be obtained for freeing the said link 5, by exerting a greater pull on the ends of the chain to effect a greater compression of the spring, when the clip may be rocked in the opposite direction about the pivot, and the end of the long finger 13 engaged with the end of the spring 3, as shown in Figure 5 of the drawing. In the event the latter position of the parts is not sufficient to permit of the removal of the link 5 from the hook 4, a further separating pull on the ends of the side chain to further compress the spring will permit the clip to be moved to the position shown in Figure 4, with the finger 13 engaging the adjacent cross head 2, when the maximum amount of extension of the connector or fastener is obtained. In this way, three different adjustments or positions of the device are obtained.

In applying the anti-skid device to a wheel, the fastener or connector is initially extended and locked by placing the foot upon the body or bulk of the chains upon the floor, and connecting the end link 5 temporarily in the hook 4 and pulling upon the same to compress the spring, when the fingers 14 or the finger 13 may be brought into engagement with the adjacent cross head, and by disengaging the link 5, the device may be easily applied in the usual manner, the link 5 again engaged and, by a slight pull outwardly at a point adjacent to the pivot 7, or by pushing inwardly thereat, depending upon which of the fingers is in engagement with the cross head, the device will snap into locking position with the said cross head seated in the recess 15 to be held from rocking and damaging the tire.

It will be noted that the loop 9 is partially circular in outline and receives the end link 10 of the side chain and also the end link 17 of the cross chain. In all other types of tire chain locks, a rivet is used to attach the lock to the side chain which makes the last link of the side chain practically solid with the lock. This results in holding the said last link in one position all the time, which causes the cross chain to wear in one spot on that link and also causes the next link of the side chain that is attached to the last link to wear excessively at the point of attachment. Now in the construction which has been defined, we have the partially circular loop 9 to which both the side chain and the cross chain are attached, and as the loop 9 is nearly circular, the two chain links 10, 17 may move around the loop 9 and the wear will not be limited to any particular spot. This is a great advantage, as it often occurs that the link next to the lock in other types of attachment will break on account of the excessive wear, while the rest of the chain may have many miles of wear left in it.

From the foregoing it will be seen that a simple and easily operated locking device has been provided for use on anti-skid chain fasteners or connectors which will greatly facilitate the application of the same to tires or the removal of the same.

What is claimed is:—

1. A tire chain fastener and lock comprising oppositely movable bars in face-to-face engagement, each bar terminating at its opposite ends in a hook or loop and a cross head, a spring surrounding the two bars and bearing against the heads of the respective bars, and a locking member pivotally mounted to the hook of one of said bars and provided with a loop for the connection and the end link of a side chain, said locking member having a plurality of engaging elements providing separate means of engaging with either the cross head of the adjacent bar or the spring to hold the latter under compression when attaching or detaching the tire chain.

2. A resilient tire chain lock comprising a pair of oppositely movable bars in face-to-face engagement, each bar having a cross head at one end, a coiled spring surrounding the bars between the heads and bearing against the latter, a loop formed at the outer end of each bar, one loop being partially closed by the cross head of the other bar and adapted to receive one of the end links of the side chains, a pivotal pin carried by the other loop, a locking member pivoted on said pin and adapted to receive the opposite end link of said side chain, said member having opposite long and short fingers to contact with the adjacent cross head or the spring to hold the spring under different degrees of tension when attaching or detaching the tire chain from a tire.

3. A resilient tire chain lock comprising coacting, oppositely movable, sliding bars, a coiled spring surrounding the same to hold them together and to resist relative, outward movement of the same, a loop formed at the outer end of one of the bars and engaging an end link of the side chain, an eye formed at the outer end of the other bar and having a pivot pin, a locking member adapted to receive the other end link and pivoted on said pin, said member having inner fingers, and an outer finger of different lengths to engage the adjacent end of the other bar to hold the spring under different degrees of compression.

4. A resilient tire chain lock comprising coacting, oppositely movable, sliding bars, a coiled spring surrounding the same to hold them together and to resist relative, outward movement of the same, a loop formed at the outer end of one of the bars and engaging an end link of the side chain, an eye formed at the outer end of the other bar and having a pivot pin, a clip having side plates pivoted on the outer ends of said pin, a loop connecting the outer ends of the plates and adapted to receive the other end link of the side chain, relatively short inner fingers formed on the said plates and adapted to engage the adjacent end of the other bar to compress the spring and separate the ends of the side chains for detachment.

5. A resilient tire chain lock comprising co-acting, oppositely movable, sliding bars, a coiled spring surrounding the same to hold them together and to resist relative, outward movement of the same, a loop formed at the outer end of one of the bars and engaging an end link of the side chain, an eye formed at the outer end of the other bar and having a pivot pin, a clip having side plates pivoted on the outer ends of said pin, a loop connecting the outer ends of the plates and adapted to receive the other end link of the side chain, a relatively long outer finger carried by the said plates and adapted to engage the adjacent end of the other bar to give maximum compression to the spring and separate the ends of the lock for attachment of the tire chain to a wheel.

6. A resilient tire chain lock having a pair of abutting, relatively-slidable, spring-compressed members, one of said members having a hook at its outer projecting end for engaging an end link of the side chain, a clip pivoted to the oppositely-projecting end of the other member and adapted to swing transversely of the members, a loop carried by the clip for engaging the opposite end link of said side chain, said clip having inner relatively short fingers normally in line with each edge of the supporting slidable member, and a relatively long outer finger normally in spaced relation to the other slidable member, the adjacent end of the latter being adapted to bear in the seat formed between the fingers to permit maximum contraction of the slidable members under the expansion of the spring to maintain the side chains taut when in position.

7. A resilient tire chain lock having a pair of abutting, relatively-slidable, spring-compressed members, one of said members having a hook at its outer projecting end for engaging an end link of the side chain, and a cross head at its opposite end, a clip pivoted to swing in and out at the oppositely-projecting end of the other member, said clip having a loop for the attachment of the other end link of the side chain and having spaced side plates straddling the supporting member and receiving the ends of the pivot, said plates having intermediate seats for normally receiving the projecting ends of said cross head under pressure of the spring, and spaced, inner, short fingers and a longer, outer finger for alternate engagement with said cross head projections to compress the spring more or less when attaching or detaching the tire chain.

8. A tire chain lock comprising a pair of slidable bars in overlapped relation and each having a cross head at its inner end, a spring surrounding the members and exerting outward pressure on the cross heads, one member having a hook at its outer end, the other member having an eye at its outer end, a locking member pivoted to said eye and having an outwardly-extending loop and side plates provided with a plurality of fingers at different distances from the pivot to bear against the cross head of the other member or the spring to compress the spring more or less and maintain the lock in open position.

9. In a tire chain lock and fastener, the combination with oppositely movable bars in face-to-face engagement, each bar terminating at its opposite ends in a loop and a cross head, a spring surrounding the two bars between the heads, and a locking member pivoted to the loop of one of the bars and provided with a seat for the cross head of the other bar, said locking member having a projecting loop partially circular in form and adapted to receive the end links of the side chain and cross chain, said links being permitted to move around the loop and thus avoid wear at any point.

10. The combination with the end links of the side chains and cross chains of a tire chain, a tire chain lock and fastener comprising elements movable relatively to each other under spring compression, said lock and fastener having as a part thereof a locking member provided with a loop partially circular in outline, said loop being adapted to receive the end links of the side chain and cross chain, which are allowed to move about said loop and thus avoid wear at any point thereon.

In testimony, that we claim the foregoing as our own we have hereto affixed our signatures.

ARTHUR A. SMITH.
HARRY W. PAINE.